Dec. 19, 1944. I. E. MOUROMTSEFF ET AL Re. 22,580

ULTRA HIGH FREQUENCY DEVICE WITH CONICAL COLLECTOR

Original Filed Oct. 25, 1940

INVENTOR
I. E. MOUROMTSEFF
G. M. DINNICK.
BY J. W. Greenhowe
ATTORNEY

Reissued Dec. 19, 1944 Re. 22,580

UNITED STATES PATENT OFFICE 22,580

ULTRA HIGH FREQUENCY DEVICE WITH CONICAL COLLECTOR

Ilia E. Mouromtseff, Montclair, and George M. Dinnick, Bloomfield, N. J., assignors to Westinghouse Electric & Manufacturing Company, East Pittsburgh, Pa., a corporation of Pennsylvania Original No. 2,295,680, dated September 15, 1942, Serial No. 362,776, October 25, 1940. Application for reissue April 24, 1943, Serial No. 484,440

7 Claims. (Cl. 315—6)

Our invention relates to ultra-high frequency apparatus, and especially to apparatus utilizing a hollow body resonator.

Recent developments in ultra-high frequency apparatus have included the type utilizing a hollow body resonator. The form of hollow body resonator found especially suitable, has been that of two closely spaced perforated surfaces forming the central portion of a doughnut shaped container. One of the forms of this type of hollow body resonator has been put on the market, and designated by the trade name of "Rhumbatron."

A combination of two of these "Rhumbatrons" has been utilized between a cathode and a collector, in which the first hollow body resonator is utilized to bunch the stream of electrons from the cathode, and the second hollow body resonator is utilized throughout to absorb energy from the bunched electron stream, and has been called a "catcher." The energy absorbed by the second hollow body resonator is, of course, fed into a suitable output circuit or antenna.

One of the particular types of apparatus utilizing such a combination of hollow body resonators, has been put on the market under the trade name of "Klystron."

Certain specific forms of types of ultra-high frequency utilizing hollow body resonators, have been described in our copending applications, Serial No. 360,367, filed October 9, 1940, for "Ultra-high frequency oscillator," now Patent No. 2,283,-895, and in Serial No. 360,366, filed October 9, 1940, for "Tuning device," now Patent No. 2,263,-184, of November 18, 1941.

It is one of the objects of our present invention to improve the operation and the efficiency of an ultra-high frequency device utilizing one or more hollow body resonators.

Another object of our invention is to provide means for concentrating the electron stream to the openings in a hollow body resonator.

A further object of our invention is to prevent over-heating in one spot of the collector by the electron stream acted upon by a hollow body resonator.

A still further object of the invention is to provide better control of the oscillations in the hollow body resonator, and specifically to accomplish this by external feed-back loops between the resonators.

A still further object of the invention is to provide a structure which may utilize other metals besides copper.

Other objects and advantages of the invention will be apparent from the following description and drawing in which.

Figure 1:
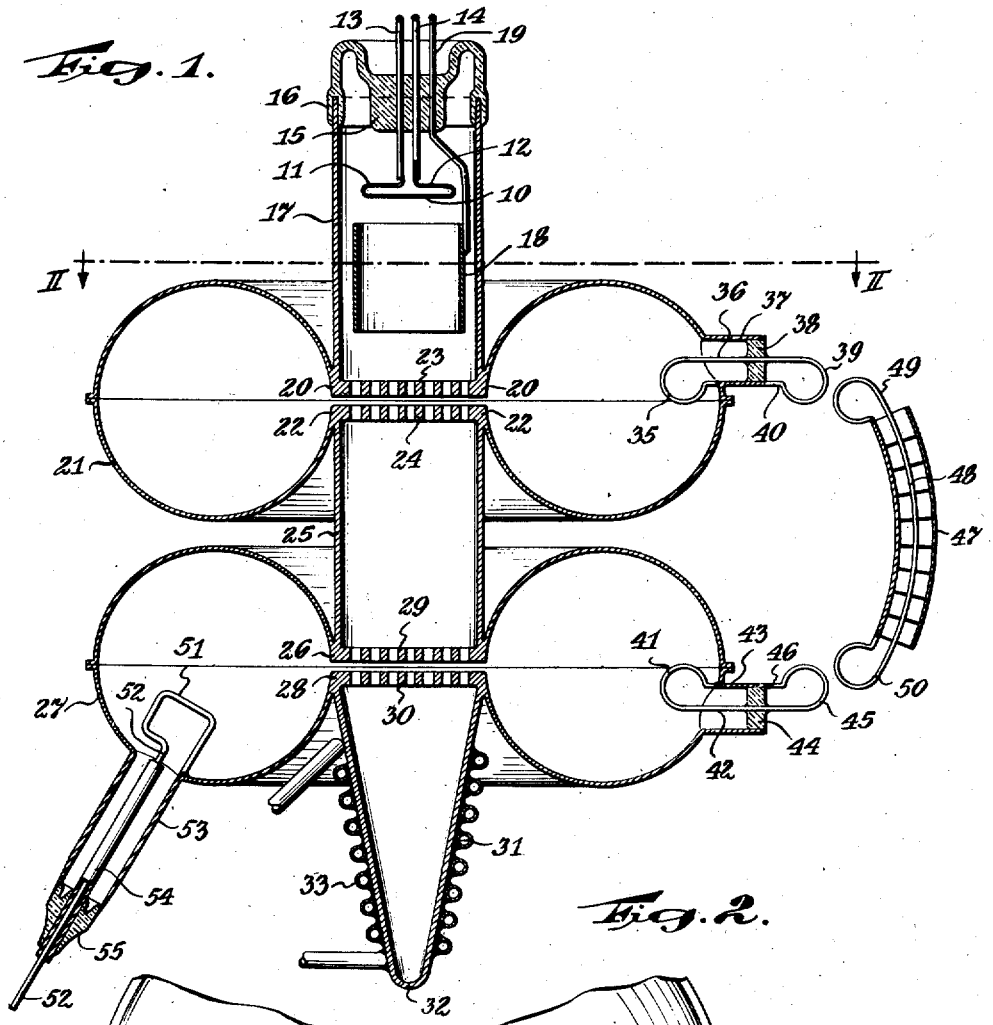
Figure 1 is a cross section through a preferred embodiment of our invention.
Figure 2:
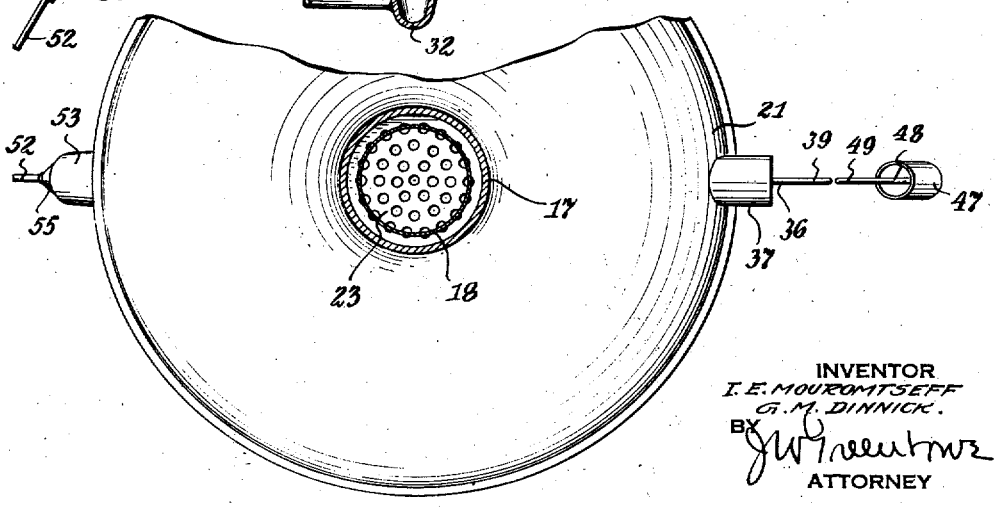
Figure 2 is a sectional view on lines II—II of Figure 1.

In Figure 1 we have disclosed our discharge device especially adapted to produce ultra-high frequencies. We provide at one end of such a tube a cathode 10, which is preferably in the form of a slotted plate with bent back full ends 11 and 12, connected to two conductors 13 and 14, sealed through a press 15 of insulation, preferably of borosilicate glass. The insulation forming this press is preferably of a re-entrant shape, having its cylinder edge 16 sealed to a cylinder 17. This metal cylinder may be of copper or a nickel-cobalt-iron alloy known under trade name of "Kovar." This cylinder encloses the cathode and inside this cylinder, we preferably provide a smaller cylinder 18 of molybdenum or nickel. This cylinder has an independent lead 19 sealed through the press 15, and a voltage in the neighborhood of 100 volts is applied to this cylinder 18 in order to concentrate the electron stream and direct it towards the other end of the enclosing cylinder 17.

The other end of this cylinder 17 is attached, as by welding, brazing or soldering, or may be integral with the upper central rim 20 of a doughnut shaped hollow body 21. This hollow body has a central rim 22, slightly spaced from the upper central rim 20. Preferably these rims 20 and 22 are spaced approximately at the vertical axis of the hollow body 21.

A perforated plate 23 extends across this rim 20 and a similar plate 24 extends across the space formed by the rim 22. A second cylinder 25 is attached to the rim 22, and extends to a rim 26 of a second hollow body resonator 27, similar in form to that of 21 and having a central rim 28 likewise spaced slightly from the rim 26 and a perforated plate 29 extending across the rim 26 having a similar rim 30 extending across the rim 28.

An enclosure 31 surrounds the openings in the perforated plate 30. This enclosure is preferably conical in form with gently tapered sides extending to an apex 32. This conical enclosure 31 with its base enclosing the openings 30, acts as the electron collector of the discharge device.

The gently tapered sides of the conical collector provide an extended surface for the impingement of electrons thereon and the extent and slope of this surface is such that the electrons cannot concentrate upon one local spot and overheat. Furthermore the electrons hit the sides of the collector at such a very acute angle that secondary or reflected primary electrons will continue on towards the apex 32 and will not interfere with electrons emerging from the exit opening 30.

The cooling means 33 may be applied to this collector in the form of the cooling coils illustrated, or a cooling blast of air may be directed thereon from any suitable fan and conduit.

In order to efficiently tune the combination of these two hollow body resonators, 21 and 27, we prefer to feed back energy from the second resonator 27 to the resonator 21. Our invention specifically concerns making an adjustable external feed-back arrangement between these two electrodes. A loop 35 in the first resonator is attached to the casing and its other end has a conductor 36 extending through a cylindrical flange 37 sealed off with insulation 38. The other end of this conductor 36 forms a loop 39, whose other end 40 is connected with the cylindrical flange.

The resonator 37 has a similar loop 41, conductor 42, flange 43, insulation 44, loop 45 and end 46. These external loops 39 and 45 are preferably connected by a transmission line in the form of a flexible cylinder 47 with a central axial conductor 48 therethrough, with end loops 49 and 50 attached to the flexible cylinder 47.

The distance between the coupling loops 39 and 49, as well as 45 and 50, is adjustable, and these loops may be held in their adjusted position by any suitable supporting means.

The spacing between the external loops, as well as the length of the transmission line, will control the feed-back line and its phase.

The form of output to an exterior transmission line or antenna, can be that shown in connection with the hollow body resonator. The form of output disclosed in the lower left hand portion of the second resonator is disclosed to illustrate a possible variation in the form of transmission connections. This output connection is a loop 51 attached to the interior casing of the resonator and has special advantages. This output connection is a loop 51 attached to the interior casing of the resonator and has a central conductor 52 passing axially through a cylindrical flange 53 of the resonator. The conductor 52 passing through this cylindrical flange 53 is enclosed by a tight fitting cylinder copper sheath 54. Insulation 55 is sealed to this copper sheath and fills the open end of the cylinder extension 53. A concentric pipe transmission line or antenna can be connected to the cylindrical flange 53 and the conductor 52.

The particular form of our discharge device permits the use of other materials besides that of copper, which has heretofore been used in such construction. The hollow body resonator can be made of cold rolled steel by symmetrical spinning or other similar strong material which permits resistance welding. In order to make the magnetic and high electrical resistivity of this steel harmless, the current-carrying surfaces can be silver or copper plated. The use of cold rolled steel permits the flexing of the walls without damage.

If it is necessary to utilize adjusting means, such as described in our copending application on "Tuning device," above referred to, the use of this steel or other strong material permits the welding thereto of portions of the casing of nickel-cobalt-iron alloy, sold under the trade name of "Kovar," which is so successful in maintaining a vacuum-tight seal with borosilicate glass. This alloy, sold under the trade name of "Kovar" is especially adapted for the cylinder 17 and the circular flanges 37, 43 and 53.

It is apparent that many modifications may be made in the particular form, structure and combination of the elements disclosed in the preferred embodiment illustrated on the drawing and, accordingly, we desire only such limitations to be imposed upon our invention as is necessitated by the spirit and scope of the following claims.

We claim:

1. A resonator structure comprising a hollow body resonator having openings therethrough for the passage of electrons, and a hollow collector adjacent thereto, said collector being conical in shape with its apex at its end remote from said resonator.

2. A discharge device comprising a cathode, a hollow body resonator having entrance and exit openings therethrough for the passage of electrons, an extension of said resonator surrounding said exit openings, said extension having a tapered closed end.

3. A discharge device comprising a cathode, a hollow body resonator having entrance and exit openings for electrons, and a conical electron collector having its base completely surrounding the exit openings in said hollow body resonator for preventing lateral escape of electrons which pass through said exit openings.

4. A discharge device comprising a hollow body resonator having two parallel spaced input and exit openings for the passage of electrons therethrough and a collector about the exit opening having an electron receiving surface the part whereof in the straight forward path of electrons presents thereto at least twice greater area than the area of said exit opening.

5. A discharge device comprising a hollow body resonator having two parallel spaced input and exit openings for the passage of electrons therethrough and a collector about the exit opening of said resonator having its sides constituting an electron-intercepting surface of which the part nearest said openings forms an angle of incidence greater than 45° to the path of electrons emerging from said resonator that the electrons are scattered over the surface of said collector and on reflecting therefrom will continue in a generally forward direction.

6. Electron discharge device comprising first and second hollow resonators, means for projecting a stream of electrons through the interiors of said resonators in succession, said means including a cathode positioned on one side of said two resonators and outside the field of the first of said resonators, and a collector positioned on the other side of said two resonators and outside the field of the second of said resonators and in axial alinement with said cathode, said collector being conical in shape with its apex at its end remote from said resonators.

7. Electron discharge device comprising first and second hollow resonators, each of said resonators having two parallel spaced input and exit openings for the passage of electrons, the exit opening of said first resonator being spaced from the input opening of said second resonator by a distance at least as great as the distance between the input and exit openings of any one of said resonators, means for projecting a stream of electrons through the openings of said resonators in succession, said means including a cathode positioned on one side of said two resonators and outside the field of the first of said resonators, and a collector positioned on the other side of said two resonators and outside the field of the second of said resonators and in axial alinement with said cathode, said collector being conical in shape with its apex at its end remote from said resonators.

ILIA E. MOUROMTSEFF.
GEORGE M. DINNICK.